United States Patent
Magen et al.

(10) Patent No.: US 11,514,019 B1
(45) Date of Patent: Nov. 29, 2022

(54) SYSTEMS AND METHODS FOR MAINTAINING AND UPDATING AN EVENT LOGGING DATABASE

(71) Applicant: Cigna Intellectual Property, Inc., Wilmington, DE (US)

(72) Inventors: Jonathan E. Magen, Philadelphia, PA (US); Ian Skillings, Bloomfield, CT (US)

(73) Assignee: Cigna Intellectual Property, Inc., Wilmington, DE (US)

( * ) Notice: Subject to any disclaimer, the term of this patent is extended or adjusted under 35 U.S.C. 154(b) by 380 days.

(21) Appl. No.: 16/730,280

(22) Filed: Dec. 30, 2019

(51) Int. Cl.
| | |
|---|---|
| *G06F 7/00* | (2006.01) |
| *G06F 17/00* | (2019.01) |
| *G06F 16/23* | (2019.01) |
| *G06F 16/22* | (2019.01) |
| *G06F 9/54* | (2006.01) |
| *G06F 11/30* | (2006.01) |

(52) U.S. Cl.
CPC ......... *G06F 16/2358* (2019.01); *G06F 9/542* (2013.01); *G06F 11/3034* (2013.01); *G06F 11/3072* (2013.01); *G06F 16/2255* (2019.01)

(58) Field of Classification Search
None
See application file for complete search history.

(56) References Cited

U.S. PATENT DOCUMENTS

| | | | |
|---|---|---|---|
| 7,076,508 | B2 | 7/2006 | Bourbonnais |
| 7,979,844 | B2 | 7/2011 | Srinivasan |
| 9,536,146 | B2 | 1/2017 | Zheng |
| 9,729,671 | B2 | 8/2017 | Faizanullah |
| 10,484,506 | B2 | 11/2019 | Faizanullah |
| 2003/0028858 | A1 | 2/2003 | Hines |
| 2006/0218206 | A1 | 9/2006 | Bourbonnais |
| 2011/0258056 | A1 | 10/2011 | Ioffe |
| 2013/0166188 | A1 | 6/2013 | Zheng |
| 2018/0075363 | A1* | 3/2018 | Duraisamy Soundrapandian ....... G06F 40/30 |
| 2019/0097909 | A1* | 3/2019 | Puri .................... H04L 41/5035 |
| 2019/0319987 | A1* | 10/2019 | Levy ...................... G06N 5/046 |
| 2020/0042426 | A1* | 2/2020 | Ambichl ............. G06F 11/3466 |

* cited by examiner

*Primary Examiner* — Tuan A Pham
(74) *Attorney, Agent, or Firm* — Miller Johnson

(57) ABSTRACT

A method includes maintaining an event logging database including entries corresponding to events processed at local servers. The method includes, in response to receiving a first message from a first local server, where the first message indicates that a first event occurred, identifying a causal parent event preceding the first event. The causal parent event is a most recent event that occurred at the first local server. The method includes identifying a temporal parent event preceding the first event. The temporal parent event is a most recent event that occurred across all of the plurality of local servers. The method includes generating a new entry based on data from the first message, an identifier of a first entry recording the causal parent event, and an identifier of a second entry recording the temporal parent event. The method includes adding the new entry to the event logging database.

21 Claims, 10 Drawing Sheets

SYSTEMS AND METHODS FOR MAINTAINING AND UPDATING AN EVENT LOGGING DATABASE

FIELD

The present disclosure relates to monitoring server processes and more particularly to generating logs for server process events.

BACKGROUND

In variety of communication systems, local servers are manually updated by operators. The operator needs to log on to a system and perform the update at a time when a local server is not in use, for example, at 10 p.m. The operator is further tasked with monitoring the changes being made to the local server to ensure the update or change is performed successfully.

The background description provided here is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A system includes at least one processor and a memory coupled to the at least one processor. The memory stores an event logging database including a plurality of entries corresponding to events processed at a plurality of local servers. The memory stores instructions for execution by the at least one processor. The instructions include, in response to receiving a first message from a first local server of the plurality of local servers. The first message indicates that a first event occurred. The instructions further include identifying a causal parent event preceding the first event. The causal parent event is a most recent event that occurred at the first local server. The instructions further include identifying a temporal parent event preceding the first event. The temporal parent event is a most recent event that occurred across all of the plurality of local servers. The instructions further include generating a new entry based on data from the first message, an identifier of a first entry recording the causal parent event, and an identifier of a second entry recording the temporal parent event. The instructions further include adding the new entry to the event logging database.

In other features, the memory stores a cache including the temporal parent event of the plurality of local servers and, for each server of the plurality of local servers, the causal parent event of the server. The instructions include, in response to generating the new entry, replacing the causal parent event of the first local server and the temporal parent event of the plurality of local servers in the cache with the new entry.

In other features, the new entry includes a hash of the first entry and a hash of the second entry. The instructions include generating a new hash of the new entry and adding the new hash to the new entry. In other features, the first message indicates the first event occurred includes a local time. The local time is recorded in response to the first event occurring on the first local server. The new entry includes the local time.

In other features, the instructions include, in response to receiving the first message, determining and adding a global time to the first message. The new entry includes the global time. In other features, the instructions include, in response to the first message indicating that a ticket started, starting a timer. The instructions include, in response to the timer exceeding a predetermined period prior to receiving a subsequent message indicating the ticket completed, generating and transmitting a stalled progress alert.

In other features, the first message includes an event type indicating at least one of: (i) a ticket has started, (ii) the ticket has completed, (iii) an instruction of the ticket has started, and (iv) the instruction of the ticket has completed. In other features, the memory stores a ticket schedule database including a set of scheduled tickets. The instructions include, in response to receiving a new ticket request, obtaining the set of scheduled tickets. The instructions include, in response to determining that a requested time and a requested time window of the new ticket request overlaps with a scheduled time and a scheduled time window of one of the set of scheduled tickets, rejecting the new ticket request.

In other features, the instructions include, in response to determining that the requested time and the requested time window of the new ticket request does not overlap with the scheduled time and the scheduled time window of one of the set of scheduled tickets, adding the new ticket request to the ticket schedule database as a scheduled ticket.

In other features, the instructions include obtaining the set of scheduled tickets, selecting a first scheduled ticket of the set of scheduled tickets, and, in response to a present time being greater than a first scheduled time of the first scheduled ticket, transmitting a ticket start instruction to a corresponding local server identified in the first scheduled ticket. In other features, the first scheduled ticket of the set of scheduled tickets is an earliest scheduled ticket.

A method includes maintaining an event logging database including a plurality of entries corresponding to events processed at a plurality of local servers. The method includes, in response to receiving a first message from a first local server of the plurality of local servers, where the first message indicates that a first event occurred, identifying a causal parent event preceding the first event. The causal parent event is a most recent event that occurred at the first local server. The method includes identifying a temporal parent event preceding the first event. The temporal parent event is a most recent event that occurred across all of the plurality of local servers. The method includes generating a new entry based on data from the first message, an identifier of a first entry recording the causal parent event, and an identifier of a second entry recording the temporal parent event. The new entry is based on a hash of the first entry and a hash of the second entry. The method includes adding the new entry to the event logging database.

In other features, the method includes storing a cache including the temporal parent event of the plurality of local servers and, for each server of the plurality of local servers, the causal parent event of the server. The method includes, in response to generating the new entry, replacing the causal parent event of the first local server and the temporal parent event of the plurality of local servers in the cache with the new entry. In other features, the first message includes a local time. The local time is recorded in response to the first event occurring on the first local server. The new entry includes the local time.

In other features, the method includes, in response to receiving the first message, determining and adding a global time to the first message. The new entry includes the global time. In other features, the method includes, in response to the first message indicating that a ticket started, starting a timer. The method includes, in response to the timer exceeding a predetermined period prior to receiving a subsequent message indicating the ticket completed, generating and transmitting a stalled progress alert. In other features, the first message includes an event type indicating at least one of: (i) a ticket has started, (ii) the ticket has completed, (iii) an instruction of the ticket has started, and (iv) the instruction of the ticket has completed.

In other features, the method includes storing a ticket schedule database including a set of scheduled tickets. The method includes, in response to receiving a new ticket request, obtaining the set of scheduled tickets. The method includes, in response to determining that a requested time and a requested time window of the new ticket request overlaps with a scheduled time and a scheduled time window of one of the set of scheduled tickets, rejecting the new ticket request.

In other features, the method includes, in response to determining that the requested time and the requested time window of the new ticket request does not overlap with the scheduled time and the scheduled time window of one of the set of scheduled tickets, adding the new ticket request to the ticket schedule database as a scheduled ticket. In other features, the method includes obtaining the set of scheduled tickets, selecting an earliest scheduled ticket of the set of scheduled tickets, and, in response to a present time being greater than a first scheduled time of the selected scheduled ticket, transmitting a ticket start instruction to a corresponding local server identified in the selected scheduled ticket.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

In the drawings, reference numbers may be reused to identify similar and/or identical elements.

DETAILED DESCRIPTION

Figure 1:
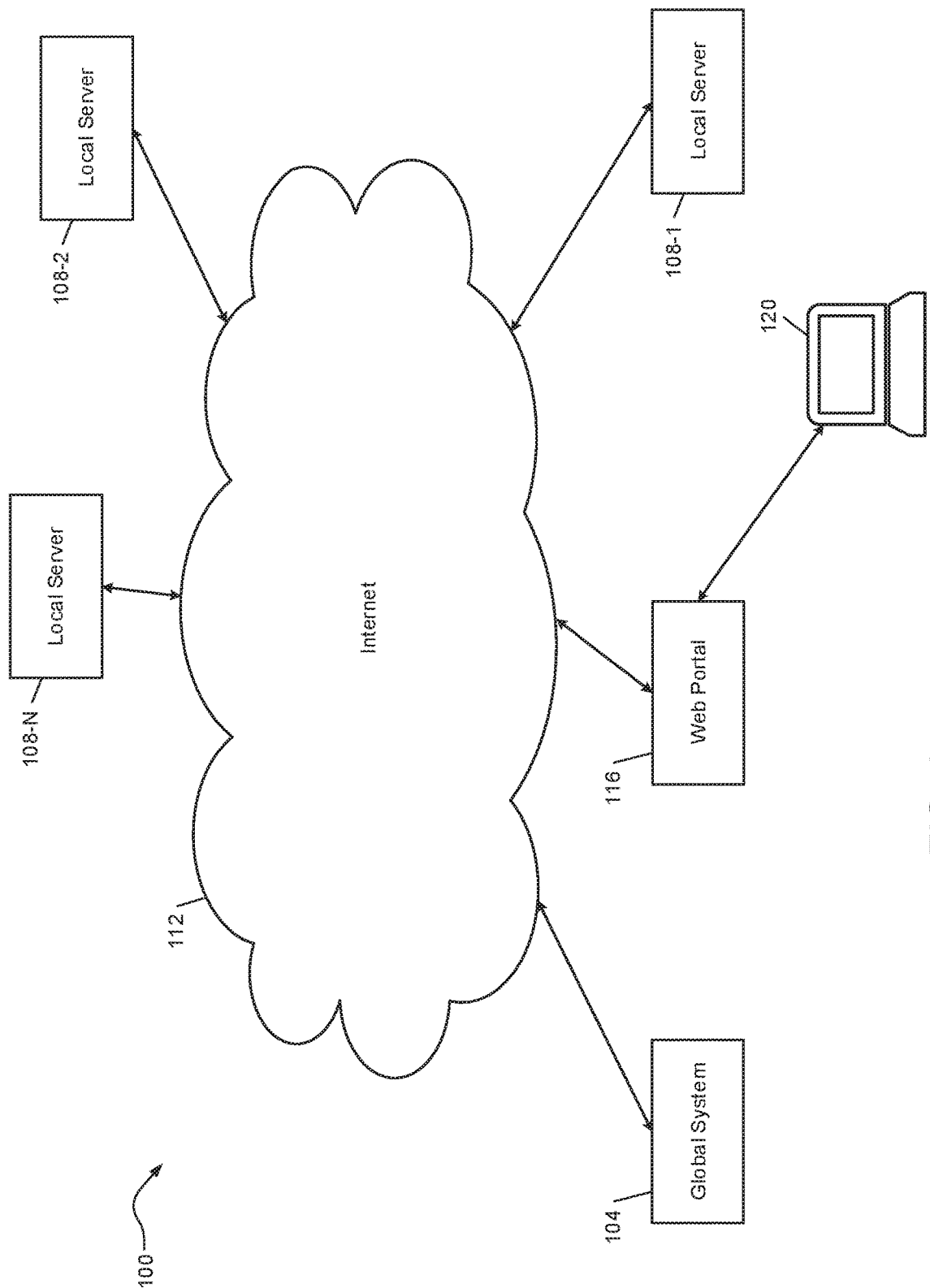
FIG. 1 is a high-level example block diagram of a ticket monitoring system according to the principles of the present disclosure.

A ticket monitoring system monitors and logs the progress of local server updates. To schedule server updates, a ticket is submitted to a global system for updating a corresponding local server. The ticket includes identifying information indicating a local server to update and a requested time to update, as well as a set of instructions to be performed on the local server to complete the update. The global system selects tickets according to their scheduled time. When the scheduled ticket time occurs, the global system instructs the update of the local server according to the instructions indicated on or pointed to by the ticket. Then, the global system waits to receive messages from the corresponding local server indicating progress of the set of instructions identified by the ticket. For example, the global system receives a message indicating a beginning of each instruction of the set of the instructions as well as a completion of each instruction.

Once received, the global system logs the message as an entry into an event logging database, including an identifier, a temporal parent identifier, a causal parent identifier, a recorded time, a received time, a hash, and a message. Therefore, since each entry includes a causal parent identifier and a temporal parent identifier, the global processes of a plurality of servers can be monitored according to the temporal order. Similarly, for each local server, the causal order of operations can also be tracked and monitored.

In various implementations, the event logging database is a distributed, append-only ledger that ensures that the scheduled tickets occurred in the logged order at the logged times. Each entry includes a hash representing all entries presently existing in the event logging database. For example, the hash may be calculated according to the SHA-2 or SHA-3 standards (as one example, SHA-512). Including a hash for each entry ensures the security and trustworthiness of the event logging database.

Each change or attempted change to a local server may be considered an event and may trigger a message to the global system. In more general terms, a finite state machine (FSM) may be implemented to control a process. Regardless of the specific FSM implemented, each transition between states of the FSM may be considered an event. Further, some or all decision points that result in the FSM remaining in the same state may be considered to be events. For purposes of illustration only, the below description describes an FSM associated with a server update process.

By automating the scheduling and operation of updates performed on local servers, the time and burden posed to operators performing the updating is reduced. Further, by monitoring and logging each update event in the event logging database, the steps and updates performed on local servers are verifiable and guaranteed.

For example, in existing systems, where servers are updated manually, an operator would have to generate and schedule a change ticket a predetermined period in advance of the change—for example, two weeks prior. Then, the operator would have to monitor the change while the change is occurring. These changes are often performed at non-peak hours, requiring overtime and disruption of the operator's schedule.

The event logging database system of the present disclosure obviates the need for advanced scheduling and monitors and logs all events, obviating the need for the operator to monitor the change. While a specific example of updating servers is described in the present disclosure, the event logging database is implemented in a general logging and monitoring system to meet the above visibility and coordination goals.

Additionally, the event logging database provides visibility and coordination across time and space. For example, the event logging database provides visibility for attestation, auditing, and analysis of the events that have occurred at local servers and the global system or control node. Similarly, the event logging database provides conflict prevention through coordination across space, by implementing variable granularity distributed locking; and time, by registering intents for collision avoidance.

Further, the events logged in the event logging database provide a high-level picture of processes occurring as well as low-level details regarding each server change. Because of this versatility, processes and events can be monitored at a large, general scale as well as at a specific, local scale. In various implementations, operators monitoring changes can configure the event logging system to automatically notify the operator (for example, on a personalized dashboard) when a particular change has occurred for a large number of servers or when a particular set of specific changes have occurred at a particular server.

Referring to FIG. 1, a high-level example block diagram of a ticket monitoring system 100 is shown. A global system 104 communicates with local servers 108-1, 108-2, . . . , and 108-N via the Internet 112. The global system 104 monitors processes performed on the local servers 108-1-108-N to log events performed on the local servers 108-1-108-N. A user can schedule changes, including upgrades and downgrades, to local servers 108-1-108-N via a web portal 116 using a user device 120. The user device 120 may be a mobile computing device, including a phone, tablet, or computer. Once a ticket including or pointing to a set of instructions for conducting changes is scheduled, the global system 104 monitors the present time and places the ticket to in progress at the scheduled time or when the scheduled time passes.

Figure 3:
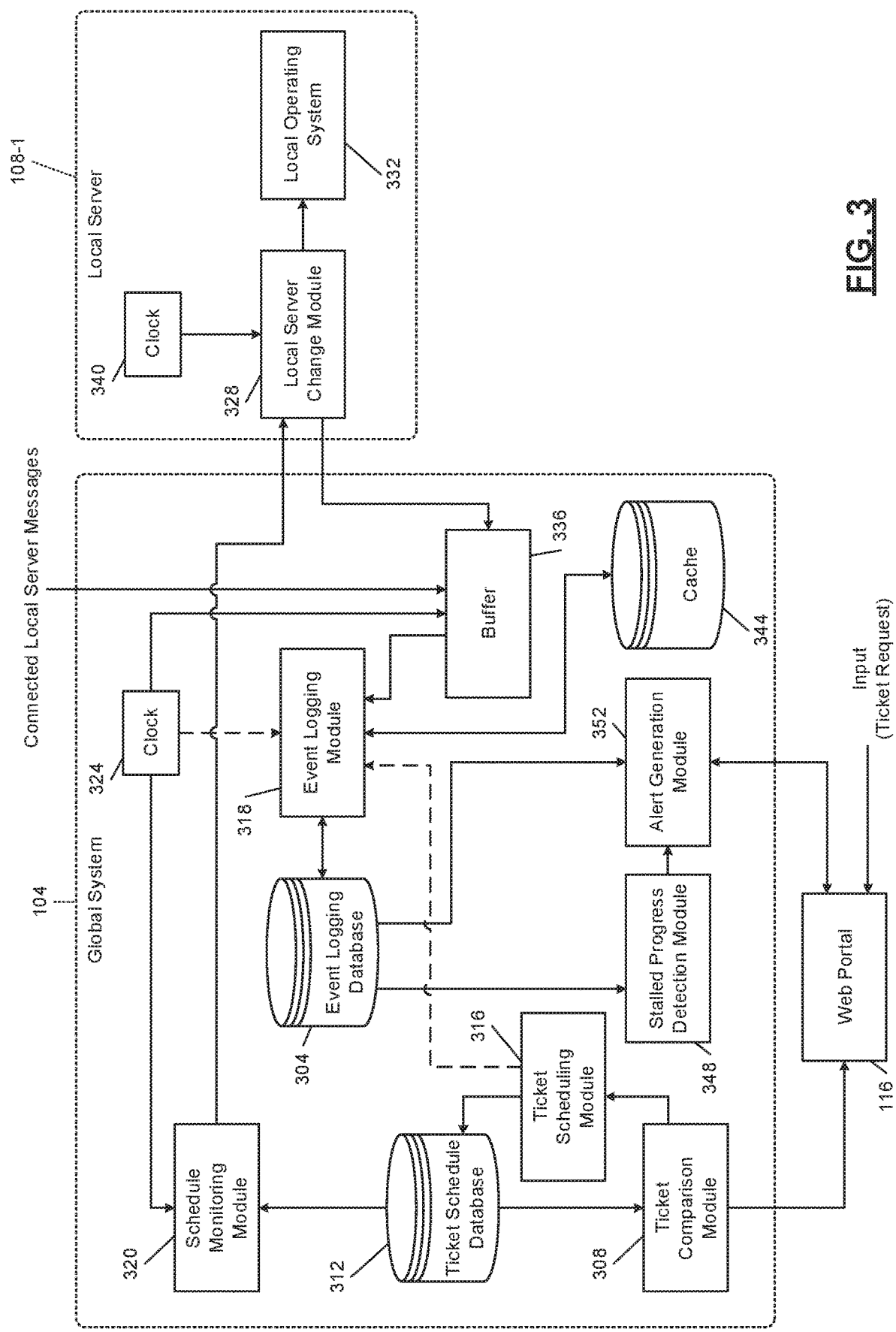
FIG. 3 is a functional block diagram of an example global system interacting with a local server within a ticket management system according to the principles of the present disclosure.

In various implementations, the logging of events may be recorded in a database (not shown) external to the global system 104, which is described in more detail in FIG. 3.

Figure 2:
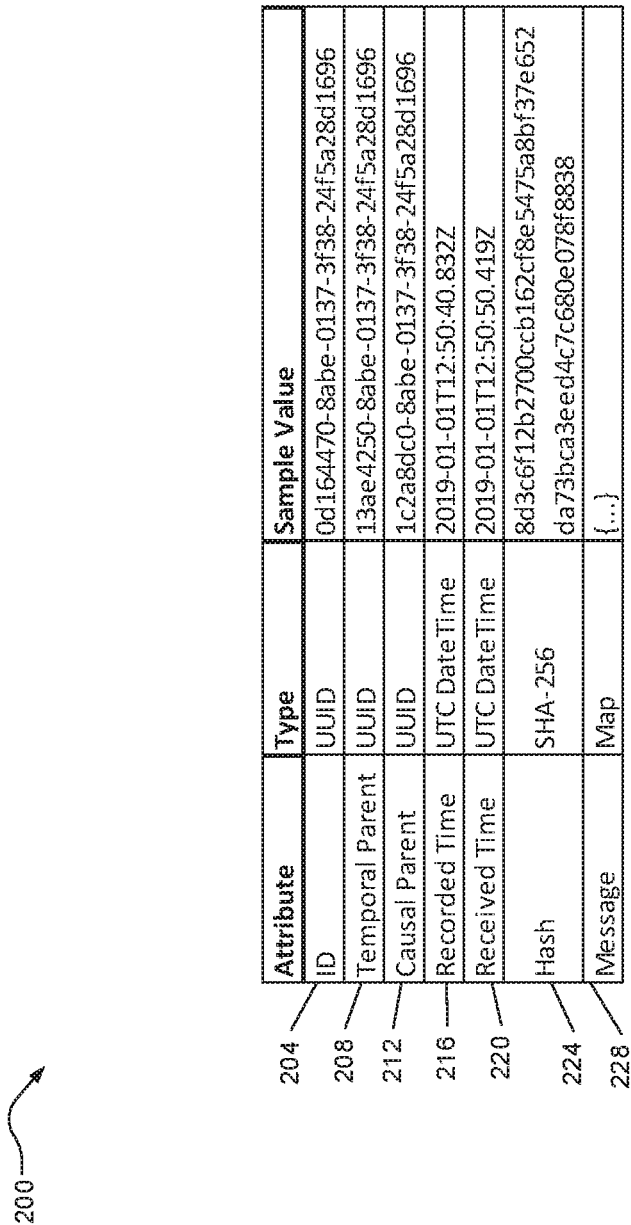
FIG. 2 is a representation of an example log entry of a single event of a ticket management system according to the principles of the present disclosure.

Referring to FIG. 2, a representation of an example log entry of a single event of a ticket management system is shown. As mentioned previously, each ticket includes a set of instructions to be performed on and by an associated local server to complete a change. The ticket monitoring system logs the beginning and completion of instructions included in the ticket. The log entries can be referred to as events. FIG. 2 is an example entry or event 200 for a particular ticket, including an identifier 204, a temporal parent 208 (identifying the temporal parent entry), a causal parent 212 (identifying the causal parent entry), a recorded time 216, a received time 220, a hash 224, and message 228.

The identifier 204 is a unique identifier that may be assigned by the associated local server or the global system once the message 228 of the event is received. The associated local server transmits the message 228 that identifies the event that is being logged such as, for example, beginning a first instruction of the set of instructions to update the local server. The temporal parent 208 refers to a most recent event performed on a plurality of local servers that the global system is monitoring. Therefore, the temporal parent 208 is the event that occurred immediately prior, on any of the local servers in communication with the global system, to the event 200. The temporal parent 208 of the entry may include an identifier of a temporal parent entry and a hash of the temporal parent entry. The causal parent 212 is a most recent local event that occurred on the associated local server immediately prior to the event 200. The causal parent 212 of the entry may include an identifier to a causal parent entry and a hash of the causal parent entry.

The recorded time 216 is the local server time at which the event occurred, which is transmitted from the local server to the global system. The received time 220 is the time at which the global system received the message from the associated local server. The ticket monitoring system tracks both the local and the global time to maintain an accurate record, independent of time zone differences or clock calibration deficiencies, of the temporal and causal relationship between events across the plurality of local servers.

The hash 224 may be a cryptographic hash, such as SHA-512 or better, and can be calculated at the global system after the message is received. The hash 224 can be used to verify the validity of the message receipt as well as proof of the existence of the receipt of the message. As described previously, each hash of an entry represents all entries presently existing in the event logging database and the present entry. Including a hash for each entry ensures the security and trustworthiness of the entries included in the event logging database. In addition to the example event of FIG. 2, below is an example JSON data object representing an event, including a hash for both the temporal and causal parent:

{
  "id": "0d164470-8abe-0137-3f38-24f5a28d1696",
  "temporal_parent": {
    "id": "13ae4250-8abe-0137-3f38-24f5a28d1696",
    "hash":
      "5b6d41b44d0f0702cc3b4bc0944be16eee7ba65
      19d5e18d6ec8339da3aef694a",
  }
  "causal_parent": {
    "id": "1c2a8dc0-8abe-0137-3f38-24f5a28d1696",
    "hash":
      "2e554606fb0e25fd19adb1e36363a8bea567937
      216c4dc945c1cf0e9789e2335",
  }
  "recorded_at": "2019-01-01T12:50:40.832Z",
  "received_at": "2019-01-01T12:50:50.419Z",
  "hash":
    "8d3c6f12b2700ccb162cf8e5475a8bf37e652da
    73bca3eed4c7c680e078f8838",
  "data": { . . . },
}

Referring to FIG. 3, a functional block diagram of an example global system interacting with a local server within a ticket management system is shown. As described with respect to FIG. 1, the global system 104 communicates with the local server 108-1 and the web portal 116 via the Internet or a direct local connection. The global system 104 maintains an event logging database 304 that stores entries of the local server 108-1 as well as the plurality of local servers in communication with the global system 104.

The global server 104 is configured to receive input, including a ticket request, at a ticket comparison module 308 via the web portal 116. The ticket comparison module 308 parses the ticket request, determining a requested local server, a requested time, and a requested time window. The ticket comparison module 308 obtains a present schedule from a ticket schedule database 312 and determines whether the requested time and time window overlaps with a scheduled time window. In various implementations, the ticket comparison module 308 may be a bloom filter configured to identify if the requested time is included in the set of scheduled tickets stored in the ticket schedule database 312.

In various implementations, the ticket schedule database 312 is implemented by the event logging database 304. For example, one form of event in the event logging database 304 is a ticket. In other words, what is referred to as the ticket schedule database 312 may actually be a materialized view of data within the event logging database 304.

If the ticket does not interfere with any previously scheduled ticket stored in the ticket scheduled database 312, then the ticket comparison module 308 forwards the ticket request to a ticket scheduling module 316. However, if the ticket request overlaps with one of the scheduled tickets, the ticket comparison module generates and transmits a denial or rejection via the web portal 116, preventing the ticket from being scheduled. In various implementations, the ticket comparison module 308 may be configured to determine a next available time window corresponding to the requested server and include in the denial a suggested alternative time.

The ticket scheduling module 316 receives the ticket request and updates the ticket schedule database 312 to include the ticket request as a scheduled ticket at the requested time, for the requested time window, and for the requested local server. In various implementations, the ticket scheduling module 316 may optionally forward a ticket scheduling event to an event logging module 318 to generate an entry indicating the ticket was scheduled. However, unlike the above description, the entry logging the ticket scheduling may include the same time for the recorded time and received time and the same entry as being the temporal parent and causal parent since the ticket scheduling event occurred on the global system 104.

A scheduled monitoring module 320 monitors the ticket schedule database 312 to determine, based on a global time received from a clock 324, when to instruct a local server change module 328 of the local server 108-1 to place the corresponding ticket to an in progress status. That is, the schedule monitoring module 320 obtains the scheduled tickets from the ticket schedule database 312. Then, when the present time of the clock 324 is equal to or greater than (for example, once the scheduled time has been reached) the scheduled time of a particular ticket, the schedule monitoring module 320 forwards the particular ticket to an associated local server, in this case, the local server 108-1 for processing.

Once the local server change module 328 is instructed to proceed with the update included in the scheduled ticket, the local server change module 328 updates a local operating system 332 according to a set of instructions included in the scheduled ticket or stored on the local server 108-1. In various implementations, the set of instructions are included in the scheduled ticket and prompt various functions accessible by the local server 108-1. As each instruction of the set of instructions is being performed, the local server change module 328 generates and transmits a message indicating the beginning of each instruction and the completion of each instruction to a buffer 336 of the global system 104. Each message includes which instruction is beginning or being completed along with a recorded time using a clock 340 operated on the local server 108-1.

The buffer 336 receives messages from connected local servers and forwards each message to the event logging module 318 in the order at which the message is received. The received time is stored by the buffer 336 according to the clock 324 time of the global system 104. The buffer 336 forwards messages to the event logging module 318 at a fixed rate and prevents a backlog of messages at the event logging module 318, allowing each received message to be processed in order.

Once received at the event logging module 318, the message is processed and an entry representing the event is generated, including an event identifier, an event temporal parent identifier, an event causal parent identifier, a recorded time, a received time, a hash, and data of the message. The event identifier (also indicating the local server 108-1), the recorded time, and the data of the message are included in the message received by the buffer 336. The received time is recorded by the buffer 336. The event logging module 318 obtains the event temporal parent identifier and the event causal parent identifier from a cache 344. In various implementations, the event logging module 318 may retrieve the event temporal parent identifier and the event causal parent identifier from the event logging database 304.

The cache 344 is configured to maintain a most recent event of each local server as well as a most recent global event. The event logging module 318 prompts the cache 344 for the most recent event of the corresponding local server (in this case, local server 108-1) and the most recent event that has been processed by the event logging module 318 (that is, the event immediately preceding the present event performed on any local server). Then, the event logging module 318 generates the hash for the entry and stores the entry and corresponding hash in the event logging database 304. Once stored, the event logging module 318 replaces the most recent event stored in the cache 344 of the corresponding local server as the present event and replaces the most recent global event in the cache 344 as the present event.

A stalled progress detection module 348 monitors the entries being logged in the event logging database 304. The stalled progress detection module 348 monitors each open ticket being logged. A ticket is considered open if an entry exists for the beginning of a ticket and the event logging database 304 does not include an entry for the corresponding ticket indicating that the ticket has been completed. The stalled progress detection module 348 forwards the ticket and most recent entry information of the ticket to an alert generation module 352 if the ticket has remained open beyond a first predetermined period, for example, 12 hours.

Additionally, the stalled progress detection module 348 may monitor instructions for each ticket, forwarding the ticket and most recent entry information of the ticket to the alert generation module 352 if the event logging database 304 has received a message that an instruction has begun but has not completed beyond a second predetermined period, for example, two hours. The alert generation module 352 generates and transmits an alert to the web portal 116 indicating stalled progress.

Figure 4:
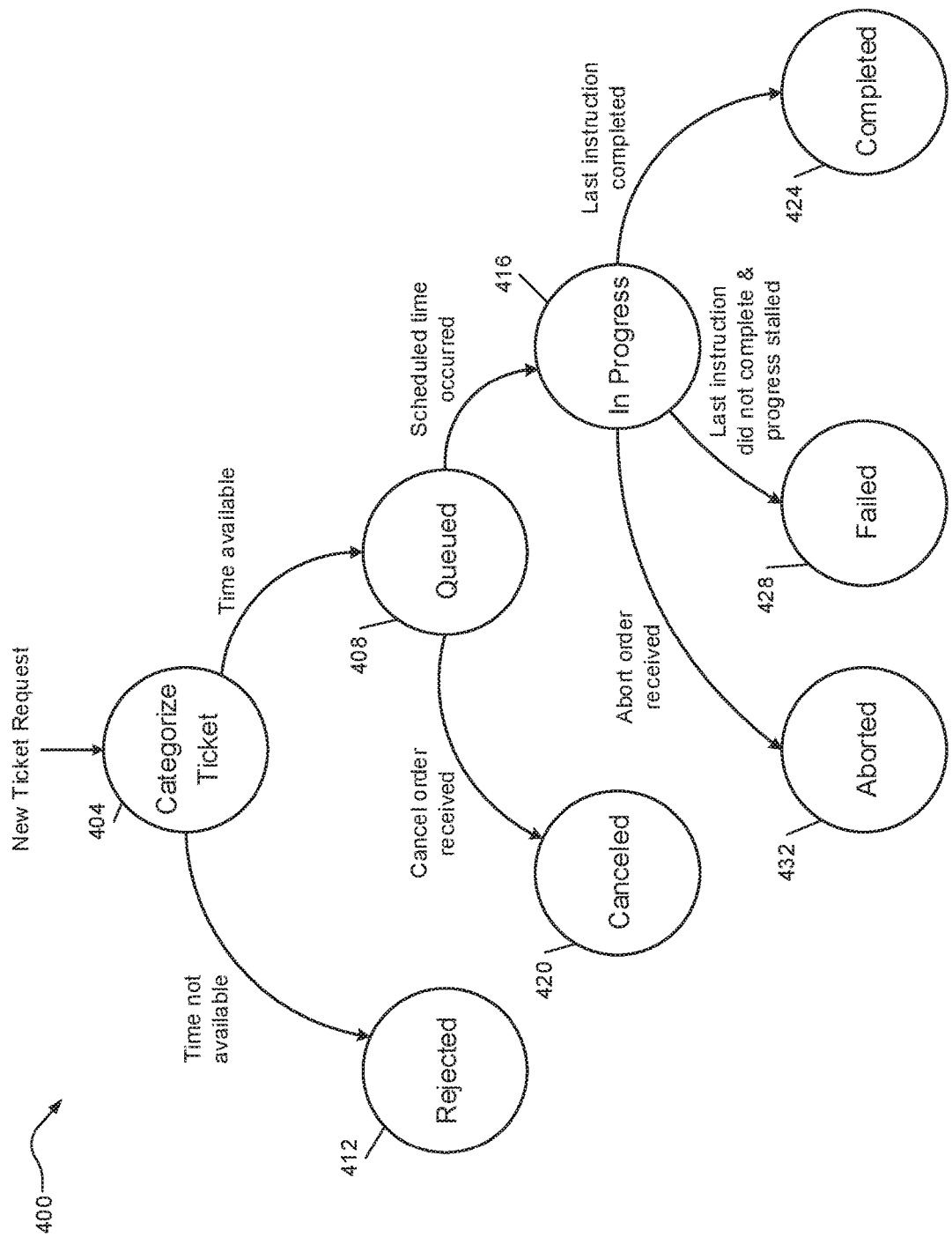
FIG. 4 is a finite state machine of an example ticket management system according to the principles of the present disclosure.

Referring to FIG. 4, a finite state machine 400 of an example ticket management system is shown. The finite state machine 400 begins by receiving a new ticket request. In 404, the ticket request is categorized as either to queued 408 or to rejected 412. The ticket request is queued 408 if the requested time included in the ticket request is available. However, the ticket request is rejected 412 if the requested time is not available.

Once queued, the ticket continues to in progress 416 once the scheduled time of the ticket has occurred. Otherwise, if the ticket was canceled prior to the scheduled time occurring, the ticket is transferred from queued 408 to canceled 420. Once in progress, the ticket proceeds to completed 424 after a last instruction is completed, failed 428 if the last instruction was not completed and the progress stalled beyond a predetermined period, or aborted 432 if an abort order was received while the ticket was in progress 416. The finite state machine 400 is an example of the processing of a ticket by the global system and local server that is logged within the event logging database 304 of FIG. 3.

Figure 5:
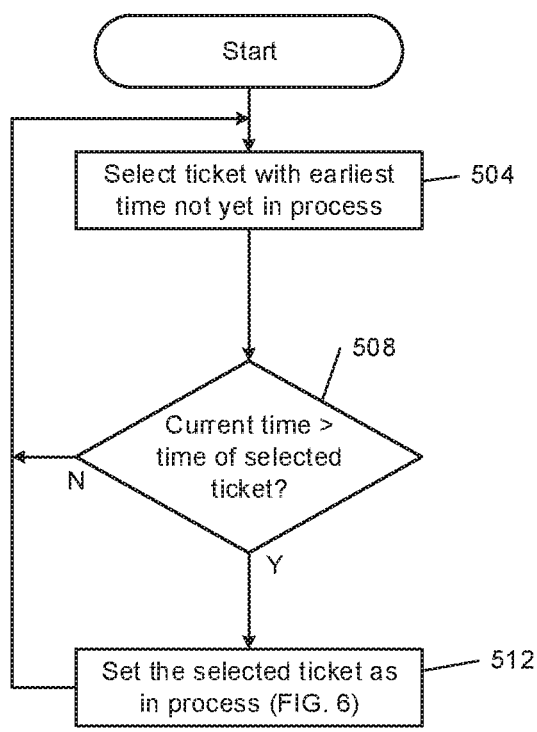
FIG. 5 is a flowchart depicting example ticket selection for processing according to the principles of the present disclosure.

Referring to FIG. 5, a flowchart depicting example ticket selection for processing is shown. Control begins at 504 by selecting a ticket with the earliest time not yet in process. The ticket is selected from a set of tickets scheduled for processing. Control proceeds to 508 to determine whether the current time is greater than a time of the selected ticket. If the current time not greater than the time of the selected ticket, control returns to 504 to select the ticket with the earliest time. Otherwise, if yes and the time of the selected ticket has occurred, control proceeds to 512 to set the selected ticket as in process as described in the flowchart of FIG. 6. Then, control returns to 504 to select another ticket.

Figure 6:
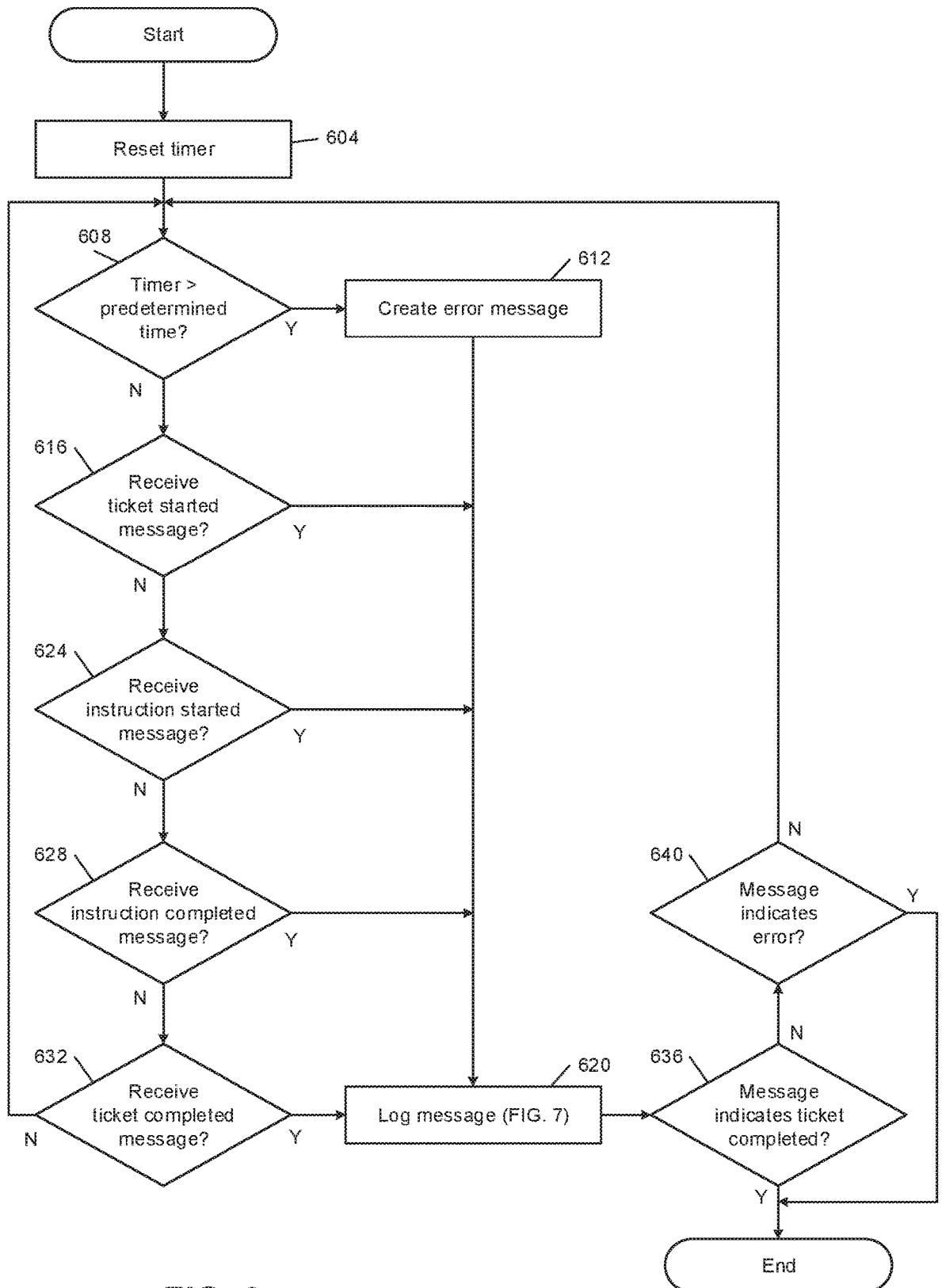
FIG. 6 is a flowchart depicting example global system operation according to the principles of the present disclosure.

Referring to FIG. 6, a flowchart depicting example global system operation is shown. Control begins at 604 to reset a timer. Control continues to 608 to determine if the timer is greater than a predetermined time. If yes, control proceeds to 612 to create an error message. That is, if the timer is greater than the predetermined time, then progress of a ticket in progress at a local server has stalled. Otherwise, control proceeds to 616 to determine if control has received a ticket started message. If yes, control proceeds to 620 to log the received message, which is described in further detail in FIG. 7.

Otherwise, if control has not received a ticket started message, control proceeds to 624 to determine if control has received a message indicating that an instruction has been started. If yes, control continues to 620, where the received message is logged. Otherwise, control proceeds to 628 to determine if control has received a message indicating that an instruction has completed. If yes, control continues to 620, where control logs the received message. Otherwise, control proceeds to 632 to determine if control has received a ticket completed message. If yes, control continues to 620, where the received message is logged. Otherwise, if control has not received a ticket completed message, control returns to 608 to determine if the timer has exceeded the predetermined time.

At 620, each message is logged, then control continues to 636 to determine whether the most recently logged message indicates that the ticket has been completed. If yes, control ends. Otherwise, control continues to 640 to determine if the most recently logged message indicated an error. If yes, then the timer has exceeded the predetermined time, indicating that progress of the ticket has stalled, and control ends. Otherwise, control returns to 608.

Figure 7:
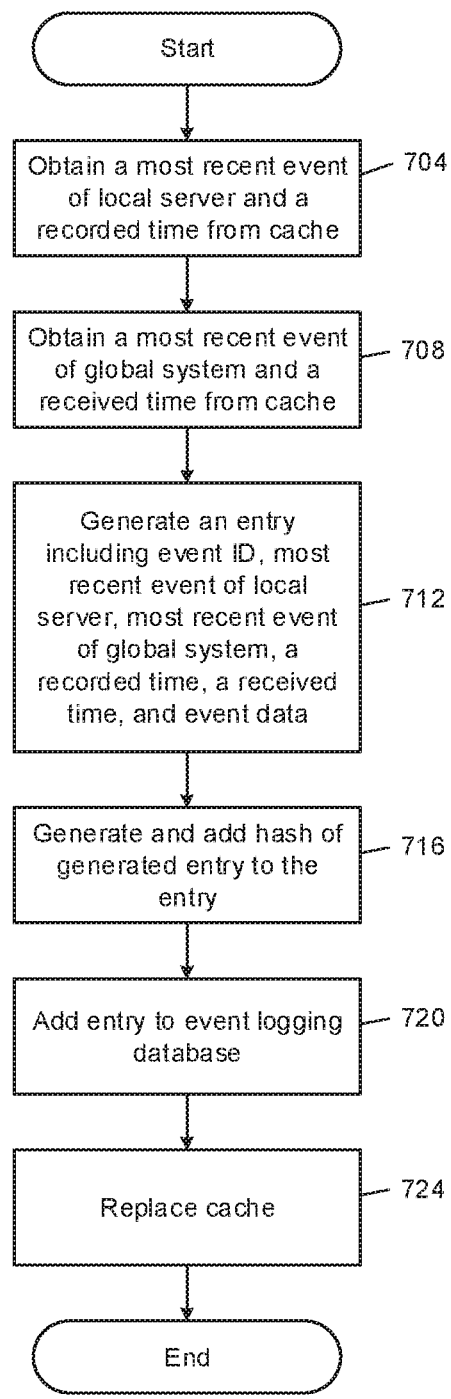
FIG. 7 is a flowchart depicting example logging of each event of a selected ticket according to the principles of the present disclosure.

Referring to FIG. 7, a flowchart depicting example logging of each event of a selected ticket is shown. Control begins at 704 to obtain a most recent event of the local server and a recorded time from a cache. That is, control obtains the last event that occurred on the local server and the recorded time at which that event occurred. Control continues to 708 to obtain a most recent event of the global system and a received time from the cache. That is, control obtains the last event that occurred on any one of a plurality of local servers and the received time at which the global system received the corresponding message.

Control continues to 712 to generate an entry including an event identifier, an identifier of a most recent event of the local server (causal parent), an identifier of a most recent event of the global system (temporal parent), a recorded time, a received time, and event data included in the received message. Control proceeds to 716 to generate and add a hash of the log to the entry. At 720, control adds the entry to an event logging database. Control then continues to 724 to replace, in the cache, the most recent event of the corresponding local server and the most recent event of the global system as the present event.

Figure 8:
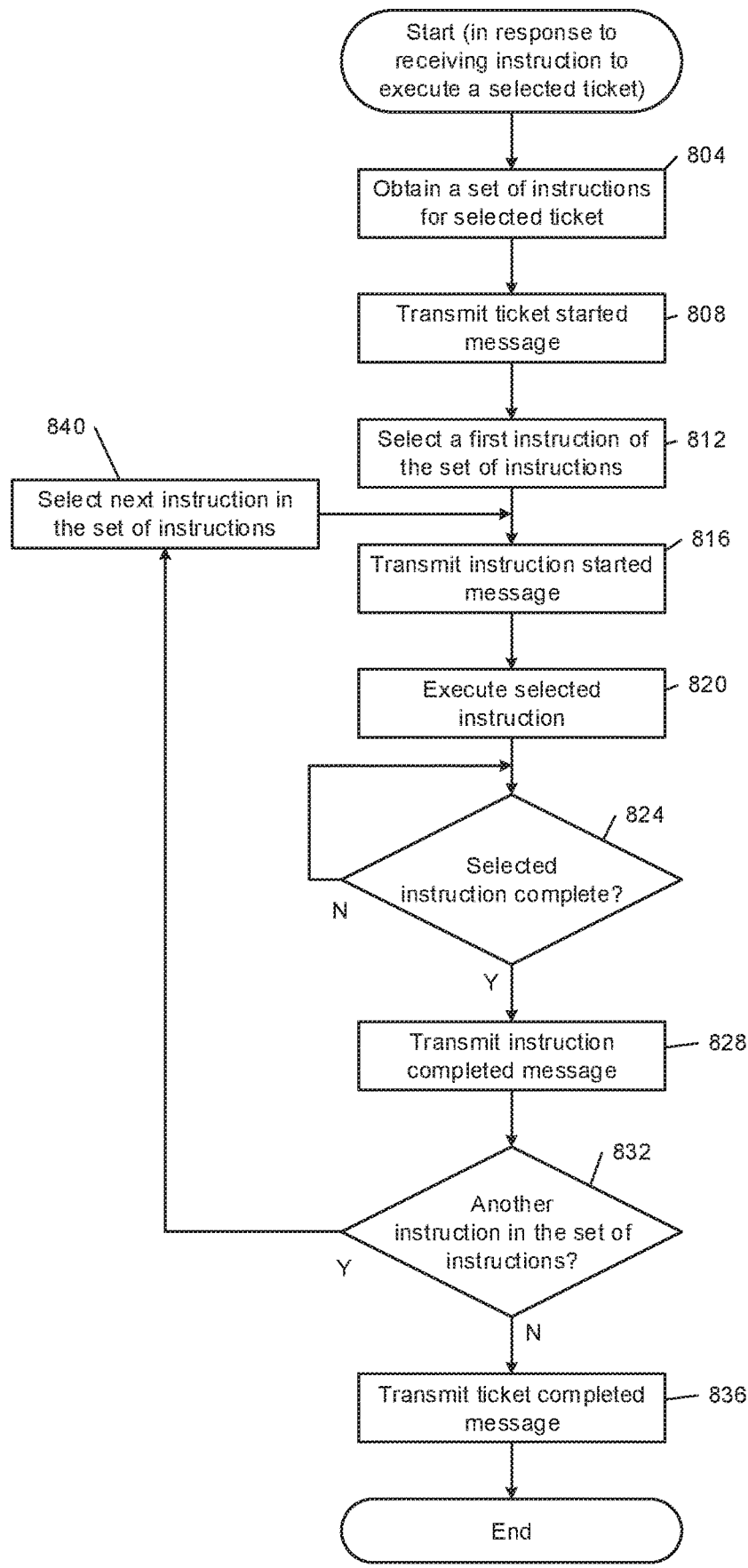
FIG. 8 is a flowchart depicting example local system operation according to the principles of the present disclosure.

Referring to FIG. 8, a flowchart depicting example local system operation is shown. Control begins in response to receiving an instruction to execute a selected ticket. Control proceeds to 804 to obtain a set of instructions for the selected ticket that has been executed. Control continues to 808 to transmit a ticket started message to the global system. Each transmitted message is sent to a global system. In various implementations, the local server may communicate such messages to other local servers. At 812, control selects a first instruction of the set of instructions. At 816, control transmits an instruction started message. Control continues to 820, where control executes the selected instruction.

Control proceeds to 824 to determine if the selected instruction has completed. If yes, control continues to 828. Otherwise, control waits until the selected instruction is completed. At 828, control transmits an instruction completed message. Control continues to 832 to determine if another instruction is in the set of instructions. If no, control transmits a ticket completed message at 836. Otherwise, control selects a next instruction in the set of instructions at 840 and returns to 816 to transmit another instruction started message, including information regarding which instruction has started. As mentioned previously, each message includes identifying information regarding the associated local server, data regarding the event that is occurring, a corresponding ticket, and a recorded time according to a local clock.

Figure 9:
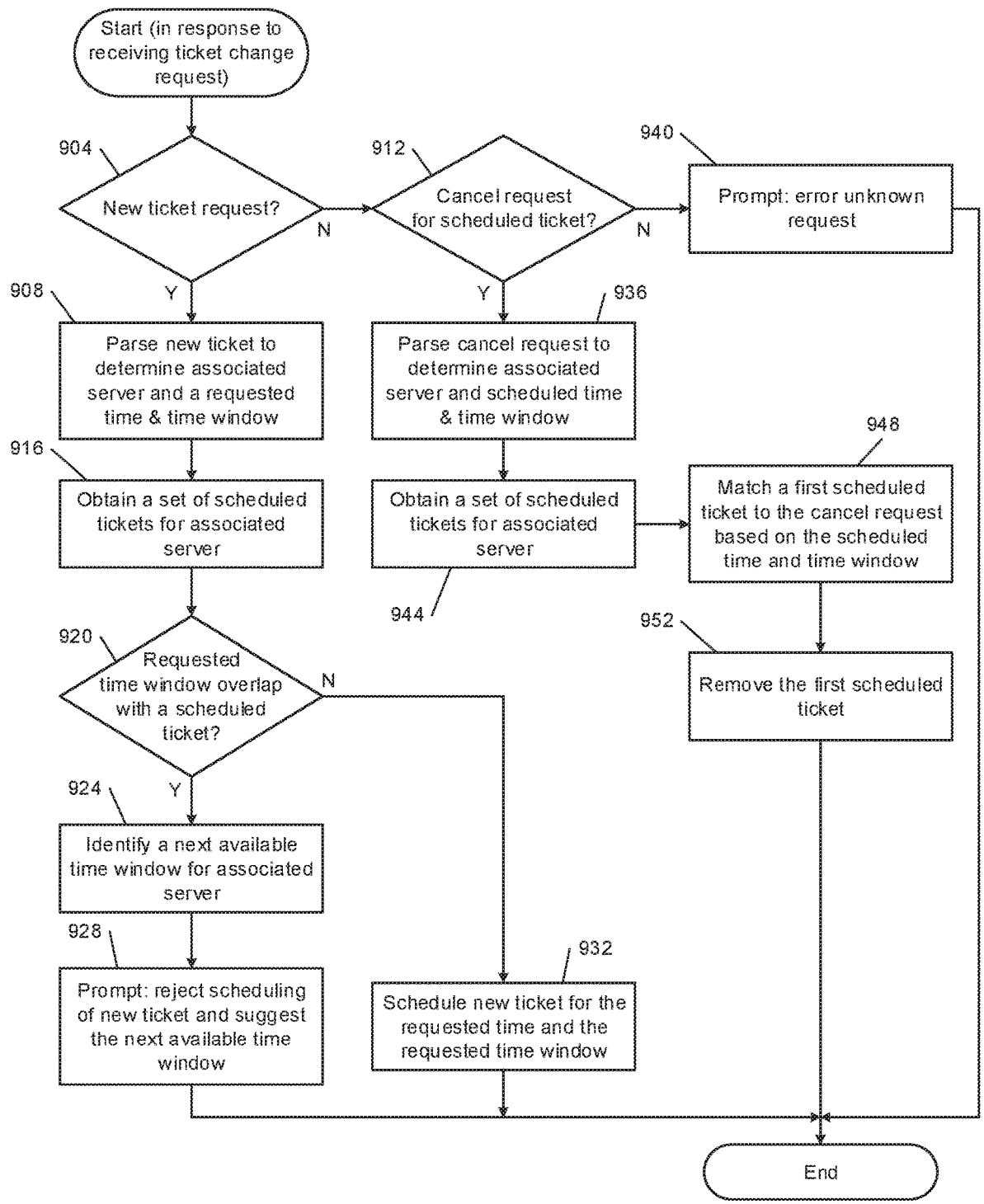
FIG. 9 is a flowchart depicting example scheduling of a ticket according to the principles of the present disclosure.

Referring to FIG. 9, a flowchart depicting example scheduling of a ticket is shown. Control begins in response to receiving a ticket change request. At 904, control determines if a new ticket request was received. If yes, control continues to 908 to parse the new ticket request to determine an associated server as well as a requested time and time window. Otherwise, control proceeds to 912 to determine if the ticket change request is a cancel request for a scheduled ticket.

Returning to 908, once the new ticket request is parsed, control continues to 916 to obtain a set of scheduled tickets for the associated server. Then, control proceeds to 920 to determine if the requested time window overlaps with a scheduled ticket. If yes, control continues to 924 to identify a next available time window for the associated server.

Then, at 928, control prompts to a screen of a user device through which the user is scheduling the ticket, for example, by the web portal, that the scheduling of the new ticket has been rejected, suggesting the identified next available time window. Then, control ends. Otherwise, if the requested time window does not overlap with the scheduled ticket, control proceeds to 932 to schedule the new ticket for the requested time and the requested time window. Then, control ends.

Returning to 912, if control determines that the ticket change request is a cancellation request for a scheduled ticket, control proceeds to 936. At 936, control parses the cancel request to determine the associated server as well as a scheduled time and time window. Otherwise, if control determines that the ticket change request is not cancel request, control continues to 940 to prompt to the user, for example, by the web portal, that an error has occurred and their request is not known. Then, control ends.

Returning to 936, once the cancel request has been parsed, control continues to 944 to obtain a set of scheduled tickets for the associated server. Then, control proceeds to 948 to match a first scheduled ticket to the cancel request ticket based on the scheduled time and time window. Then, at 952, control removes the first scheduled ticket and control ends.

Figure 10:
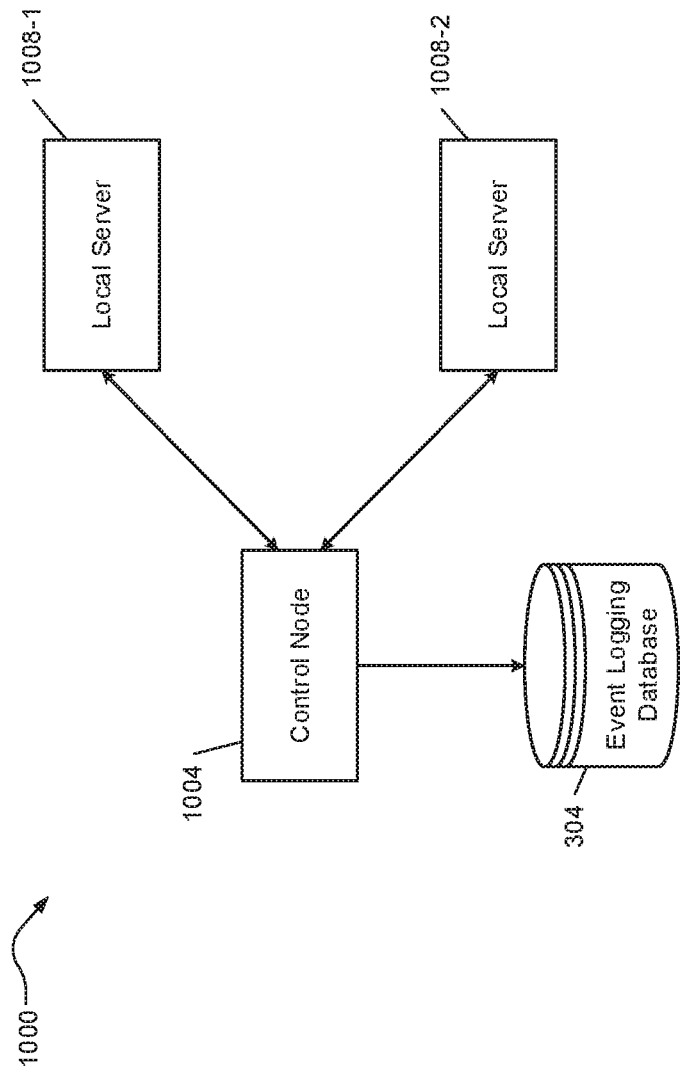
FIG. 10 is a functional block diagram of an example event logging system according to the principles of the present disclosure.

FIG. 10 illustrates a functional block diagram of an example event logging system 1000 according to the principles of the present disclosure. The event logging system 1000 includes a control node 1004, which may be implemented similarly to the global system 104 of FIG. 1. The control node 1004 communicates with local servers 1008-1 and 1008-2, which may be implemented similarly to the local servers 108-1 and 108-2 described in FIG. 1. The control node 1004 is a server that orchestrates and controls changes or updates to the local servers 1008-1 and 1008-2.

For example, the control node 1004 may modify one or both of the local servers 1008-1 and 1008-2 by upgrading them, replacing the configuration file, restarting the service, or performing another server modification that introduces some change. Then, the occurrence of the change at the local servers 1008-1 and 1008-2 is communicated to the event logging database 304 (originally introduced in FIG. 3) via the control node 1004. As shown, in various implementations the event logging database 304 may be separate from the control node 1004. The event logging database 304 generates and stores a record of each event or change occurring at the control node 1004 and the local servers 1008-1 and 1008-2.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are IEEE Standard 802.15.4 (including the ZIGBEE standard from the ZigBee Alliance) and, from the Bluetooth Special Interest Group (SIG), the BLUETOOTH wireless networking standard (including Core Specification versions 3.0, 4.0, 4.1, 4.2, 5.0, and 5.1 from the Bluetooth SIG).

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules.

Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A system comprising:
at least one processor and
a memory coupled to the at least one processor, wherein the memory stores:
an event logging database having an append-only attribute and that includes a plurality of entries corresponding to events processed at a plurality of servers and
instructions for execution by the at least one processor and
wherein the instructions include, in response to receiving a first message from a first server of the plurality of servers, wherein the first message indicates that a first event occurred:
identifying a causal parent event preceding the first event, wherein the causal parent event is a most recent event that occurred at the first server;
identifying a temporal parent event preceding the first event, wherein the temporal parent event is a most recent event that occurred across all of the plurality of servers;
generating a new entry based on data from the first message, an identifier of a first entry recording the causal parent event, an identifier of a second entry recording the temporal parent event, and a cryptographic hash, wherein the cryptographic hash is calculated based on a hash of the first entry, a hash of the second entry, data from the first message, the identifier of the first entry, and the identifier of the second entry; and
adding the new entry to the event logging database, wherein the instructions enforce the append-only attribute of the event logging database.

2. The system of claim 1 wherein:
the memory stores a cache including the temporal parent event of the plurality of servers and for each server of the plurality of I servers, the causal parent event of the server and the instructions include, in response to generating the new entry, replacing the causal parent event of the first server and the temporal parent event of the plurality of servers in the cache with the new entry.

3. The system of claim 1 wherein:
the first message includes a local time;
the local time is recorded in response to the first event occurring on the first server; and
the new entry includes the local time.

4. The system of claim 1 wherein:
the instructions include, in response to receiving the first message, determining and adding a global time to the first message and
the new entry includes the global time.

5. The system of claim 1 wherein the instructions include:
in response to the first message indicating that a ticket started, starting a timer and
in response to the timer exceeding a predetermined period prior to receiving a subsequent message indicating the ticket completed, generating and transmitting a stalled progress alert.

6. The system of claim 1 wherein the first message includes an event type indicating at least one of: (1) a ticket has started, (ii) the ticket has completed, (iii) an instruction of the ticket has started, and (iv) the instruction of the ticket has completed.

7. The system of claim 1 wherein:
the memory stores a ticket schedule database including a set of scheduled tickets and the instructions include:
in response to receiving a new ticket request, obtaining the set of scheduled tickets and
in response to determining that a requested time and a requested time window of the new ticket request overlaps with a scheduled time and a scheduled time window of one of the set of scheduled tickets, rejecting the new ticket request.

8. The system of claim 7 wherein the instructions include, in response to determining that the requested time and the requested time window of the new ticket request does not overlap with the scheduled time and the scheduled time window of one of the set of scheduled tickets, adding the new ticket request to the ticket schedule database as a scheduled ticket.

9. The system of claim 7 wherein the instructions include:
obtaining the set of scheduled tickets, selecting a first scheduled ticket of the set of scheduled tickets, and in response to a present time being greater than a first scheduled time of the first scheduled ticket, transmitting a ticket start instruction to a corresponding server identified in the first scheduled ticket.

10. The system of claim 9 wherein the first scheduled ticket of the set of scheduled tickets is an earliest scheduled ticket.

11. The system of claim 1 wherein:
the first message includes a local time;
the local time is recorded in response to the first event occurring on the first server and corresponds to a clock maintained on the first server;
the instructions include, in response to receiving the first message, determining and adding a global time to the first message;
the global time corresponds to a single clock that is unique across the plurality of servers; and
the new entry includes information indicating the local time and the global time.

12. A method comprising:
maintaining an event logging database including a plurality of entries corresponding to events processed at a plurality of servers; and
in response to receiving a first message from a first server of the plurality of servers, wherein the first message indicates that a first event occurred:
identifying a causal parent event preceding the first event, wherein the causal parent event is a most recent event that occurred at the first server;
identifying a temporal parent event preceding the first event, wherein the temporal parent event is a most recent event that occurred across all of the plurality of servers;
generating a new entry based on data from the first message, an identifier of a first entry recording the causal parent event, and an identifier of a second entry recording the temporal parent event, and a cryptographic hash, wherein the cryptographic hash is calculated based on a hash of the first entry, a hash of the second entry, data from the first message, the identifier of the first entry, and the identifier of the second entry; and
adding the new entry to the event logging database.

13. The method of claim 12 further comprising: storing a cache including the temporal parent event of the plurality of servers and, for each server of the plurality of servers, the causal parent event of the server and in response to generating the new entry, replacing the causal parent event of the first server and the temporal parent event of the plurality of servers in the cache with the new entry.

14. The method of claim 12 wherein: the first message includes a local time; the local time is recorded in response to the first event occurring on the first server; and the new entry includes the local time.

15. The method of claim 12 further comprising: in response to receiving the first message, determining and adding a global time to the first message, wherein the new entry includes the global time.

16. The method of claim 12 further comprising: in response to the first message indicating that a ticket started, starting a timer and in response to the timer exceeding a predetermined period prior to receiving a subsequent message indicating the ticket completed, generating and transmitting a stalled progress alert.

17. The method of claim 12 wherein the first message includes an event type indicating at least one of: (i) a ticket has started, (ii) the ticket has completed, (iii) an instruction of the ticket has started, and (iv) the instruction of the ticket has completed.

18. The method of claim 12 further comprising:
storing a ticket schedule database including a set of scheduled tickets,
in response to receiving a new ticket request, obtaining the set of scheduled tickets, and
in response to determining that a requested time and a requested time window of the new ticket request overlaps with a scheduled time and a scheduled time window of one of the set of scheduled tickets, rejecting the new ticket request.

19. The method of claim 18 further comprising, in response to determining that the requested time and the requested time window of the new ticket request does not overlap with the scheduled time and the scheduled time window of one of the set of scheduled tickets, adding the new ticket request to the ticket schedule database as a scheduled ticket.

20. The method of claim 18 further comprising:
obtaining the set of scheduled tickets,
selecting an earliest scheduled ticket of the set of scheduled tickets, and
in response to a present time being greater than a first scheduled time of the selected scheduled ticket, transmitting a ticket start instruction to a corresponding server identified in the selected scheduled ticket.

21. The method of claim 12 wherein:
the first message includes a local time;
the local time is recorded in response to the first event occurring on the first server and corresponds to a clock maintained on the first server;
the method further comprises, in response to receiving the first message, determining and adding a global time to the first message;
the global time corresponds to a single clock that is unique across the plurality of servers; and
the new entry includes information indicating the local time and the global time.

\* \* \* \* \*